United States Patent [19]
Hofmann et al.

[11] Patent Number: 6,153,083
[45] Date of Patent: Nov. 28, 2000

[54] ELECTROLYZER ISOLATED BY ENCAPSULATION WITH RESPECT TO PRESSURIZED WATER

[75] Inventors: Hans Hofmann, Muehlheim; Lutz Mueller-Froelich, Munich, both of Germany

[73] Assignee: MTU Motoren-und Turbinen-Union Friedrichshafen GmbH, Friedrichshafen, Germany

[21] Appl. No.: 09/331,390
[22] PCT Filed: Dec. 17, 1997
[86] PCT No.: PCT/EP97/07080
   § 371 Date: Aug. 19, 1999
   § 102(e) Date: Aug. 19, 1999
[87] PCT Pub. No.: WO98/27249
   PCT Pub. Date: Jun. 25, 1998

[30] Foreign Application Priority Data

Dec. 19, 1996 [DE] Germany ............ 296 22 000 U

[51] Int. Cl.$^7$ .................................................. C25C 1/02
[52] U.S. Cl. ................. 205/628; 204/258; 204/267; 204/270; 204/278
[58] Field of Search ............ 205/628; 204/258, 204/278, 270, 267

[56] References Cited

FOREIGN PATENT DOCUMENTS 2 568 897  2/1986  France .
98/04762  2/1998  WIPO .

*Primary Examiner*—Kathryn Gorgos
*Assistant Examiner*—Thomas H. Parsons
*Attorney, Agent, or Firm*—Evenson, McKeown, Edwards & Lenahan, P.L.L.C.

[57] ABSTRACT

The invention relates to an electrolyzer for the electrolysis of water in hydrogen and oxygen with a number of electrolytic cells, each containing an anode and a cathode, connected in series in a cell block surrounded by a pressure vessel. At one end of the cell block is a first electrode, and at the opposite end of the cell block is a second electrode. Both are connected with leading-in cables, which run through the pressure vessel and conduct the electric current to the cell block, the interior of the pressure vessel being filled with pressurized water surrounding the cell block. In accordance with the invention, it is envisaged that the first electrode is placed inside the cell block so as to be electrically isolated, by encapsulation, with respect to the pressurized water, and that there is a channel, sealed against the pressurized water, that leads from the cell block through the pressurized vessel to the outside. Through this cannel, the leading-in cable, which is connected with the first electrode, is led to said first electrode.

20 Claims, 2 Drawing Sheets

ELECTROLYZER ISOLATED BY ENCAPSULATION WITH RESPECT TO PRESSURIZED WATER

BACKGROUND OF THE INVENTION

Field of the Invention

The invention relates to an electrolyzer for the electrolysis of water in hydrogen and oxygen with a number of electrolytic cells, each containing an anode and a cathode, connected in series in a cell block surrounded by a pressure vessel. At one end of the cell block, a first electrode (anode) is situated, and at the opposite end of the cell block, a second electrode (cathode) is situated, which are each connected with leading-in cables which run through the pressure vessel and conduct electric current to the cell block, the interior of the pressure vessel being filled with pressurized water surrounding the cell block.

An electrolyzer of the above-mentioned type is used for the electrolytic disintegration of water into hydrogen and oxygen, for example, for obtaining hydrogen within the scope of future hydrogen technologies. A modern electrolyzer of this type operates by means of an alkaline electrolyte and at an increased pressure and an increased temperature of, for example, 30 bar and 150° C. The leading-in cables required for the electric connection of the cell block extend from the cell block through the pressurized water surrounding it through the pressure vessel. In this case, special demands are made on the electric insulation of these leading-in cables, since these must withstand the above-mentioned high pressures and temperatures, as in particular also the pressure differences and temperature differences occurring during a change of the operating condition. The known polymeric isolations withstand these conditions only for a short time so that electric shunts occur in the interior of the pressure vessel which may result in power losses, shunt electrolysis and the formation of electrolytic gas.

SUMMARY OF THE INVENTION

It is an object of the invention to provide an electrolyzer with an improved current feeding.

The electrolyzer according to the invention, which is used for the electrolysis of water in hydrogen and oxygen, contains a number of electrolytic cells, each containing an anode and a cathode, connected in series in a cell block surrounded by a pressure vessel. At one end of the cell block, a first electrode is situated, and at the opposite end of the cell block, a second electrode is situated, which are each connected with leading-in cables which run through the pressure vessel to the outside and conduct electric current to the cell block. The interior of the pressure vessel is filled with pressurized water surrounding the cell block. According to the invention, it is provided that the first electrode is arranged in the interior of the cell block in an encapsulated, electrically isolated manner with respect to the pressurized water, and in that a channel is provided which leads from the cell block through the pressure vessel to the outside, is sealed off with respect to the pressurized water and through which the leading-in cable connected with the first electrode is led to the first electrode, It is an advantage of the electrolyzer according to the invention that, when the current is supplied, it can be fed to the first electrode in a dry and pressureless manner. No negative effect therefore occurs with respect to the isolation of the leading-in cables.

According to a further development of the invention, it is provided that the second electrode and the leading-in cable connected with the second electrode are on the same potential as the pressure vessel, and that the leading-in cable connected to the second electrode is led through the pressurized water to the outside. This has the advantage that, because of the same potential of the second electrode and of the pressure vessel, no special demands are made with respect to isolating the leading-in cable of the second electrode.

It is particularly advantageous for the potential of the second electrode to simultaneously be the ground potential (mass). By the compensation of the potential of the pressure vessel and the second electrode, an intrinsic contact protection of the vessel is created without additional constructional measures.

According to a further development of the invention, it is provided that also the second electrode is arranged in the interior of the cell block in an encapsulated, electrically isolated manner with respect to the pressurized water, and that also the leading-in cable connected with the second electrode is led in a dry manner to the second electrode through a channel which leads from the cell block through the pressure vessel to the outside and is sealed off with respect to the pressurized water. This embodiment therefore provides a dry and pressureless current feeding for both electrodes so that no problems with respect to the isolation exist for both leading-in cables. This is particularly suitable for electrolyzers in the case of which no electrode is to be situated on the potential of the pressure vessel and therefore the ground potential.

According to a further development of the electrolyzer according to the invention, it is provided that the encapsulated electrode is arranged on the interior side of an electrode pressure plate which closes off the cell block at the end and has a recess for the leading-in cable connected with the electrode, which recess leads into the channel leading to the outside. On the interior side of the recess, the encapsulated electrode is held in an electrically isolated manner by means of a holding frame. This results in an implementation of the encapsulated electrode situated in the interior of the cell block which is easy to carry out in practice.

In this embodiment, at least one sealing plate made of an electrically insulating material may be arranged between the encapsulated electrode and the electrode pressure plate.

In the case of the above-mentioned embodiment, it is particularly advantageous for a sealing plate to have openings or channels which are connected with the recess in the electrode pressure plate, through which openings or channels water vapor generated between the electrode and the anode pressure plate can exit into the channel leading to the outside.

The embodiment of the electrolyzer according to the invention is particularly advantageous in the case of an electrolyzer whose cell block contains an alkaline electrolyte. The reason is that in this case the advantages of the dry pressureless current feeding are combined with the advantages of a water dish separation of the hot alkaline electrolyte from the environment by the pressurized water contained in the pressure vessel.

According to an embodiment, it is provided that the first electrode is an anode and consists of nickel.

In the case of the above-mentioned embodiments, it is an advantage for the electrode pressure plate to consist of an austenitic precious metal.

Finally, an embodiment which is advantageous in practice consists of the fact that the holding frame contains a blind frame consisting of plastic. According to a second embodiment of the invention, it is provided that two cell blocks are arranged in a common pressure vessel against one another on their faces, first electrodes being situated on the opposite ends of the cell blocks, and second electrodes being situated on the adjacent ends of the cells blocks. The first electrodes are electrically isolated in the interior of the cell blocks with respect to the pressurized water, and the leading-in cables connected with the first electrodes lead to the outside through channels sealed off with respect to the pressurized water. This embodiment has the advantage that large systems can be manufactured in a space-saving manner and at particularly reasonable cost.

According to a further development of the second embodiment, it is provided that the leading-in cables connected with the second electrode are on the same potential as the pressure vessel and are led to the outside through the pressurized water, particularly that the potential of the second electrode is simultaneously the ground potential (mass). This has the advantage of a complete intrinsic contact protection of the cell block.

Finally, the second embodiment is advantageously constructed such that the pressure vessel consists of two abutting vessel parts. This permits a space-saving and expenditure-saving construction which requires no base plates closing off the open side of the pressure vessel which would be the case if the cell blocks were arranged separately.

Other objects, advantages and novel features of the present invention will become apparent from the following detailed description of the invention when considered in conjunction with the accompanying drawings.

DETAILED DESCRIPTION OF THE DRAWINGS

Figure 1:
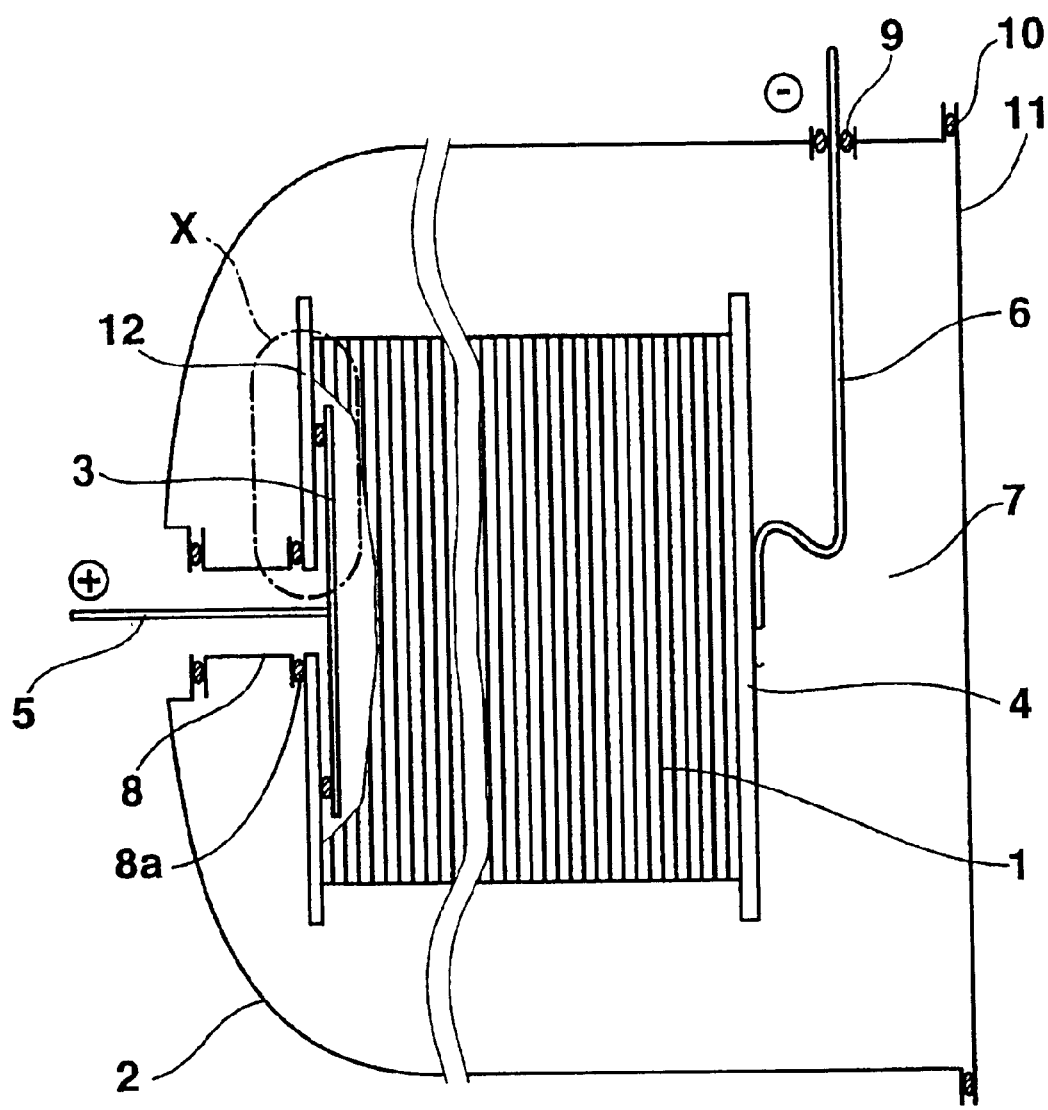
FIG. 1 is a cross-sectional view of an electrolyzer according to a first embodiment of the invention.

In the case of the embodiment of the electrolyzer according to the invention which is represented in FIG. 1 in a cross-sectional view, an electrolytic cell block 1 is arranged in a pressure vessel 2. The cell block 1 consists of a number of electrolytic cells which are mechanically and electrically connected in series, each of which contains an anode, a cathode, a semipermeable membrane and current collecting elements for the electric connection. However, these parts are not illustrated individually. At the ends of the cell block, a first and a second electrode respectively are arranged, by way of which the current required for the electrolysis operation is fed to the cell block. At one end of the cell block 1, a first electrode is situated, specifically an anode 3, which is connected with a leading-in cable 5; while a second electrode, specifically a cathode 4, is situated at the opposite end of the cell block 1 and is connected with a leading-in cable 6. Furthermore, devices for feeding and processing the alkaline electrolyte and for collecting the hydrogen and oxygen gases generated by the electrolysis are provided on the cell block 1. These devices are also not illustrated in detail in the figure. The space surrounding the cell block 1 in the pressure vessel 1 is filled with a deionized pressurized water 7 which is maintained, for example, at a temperature of 150° C. and at a pressure of 30 bar.

The anode 3, which is situated on one end of the cell block 1, is arranged in an encapsulated and electrically isolated manner with respect to the pressurized water 7 in the interior of the cell block 1. The leading-in cable 5 connected with the anode 3 is led to the outside in a dry and pressureless manner through a channel 8 sealed off with respect to the pressurized water 7. The channel 8 is formed by a cylindrical sleeve which is provided with flanges on its ends and is connected by way of sealing devices 8a, on the one side, with a flange on the pressure vessel 2 and, on the other side, with an electrode pressure plate 12 on the end of the cell block 1 and is sealed off with respect to the pressurized water. The flanges of the channel 8 are connected by means of bolts with the flange of the pressure vessel 2 and the anode pressure plate 12. Between the leading-in cable 5 and the interior of the channel 8, a ring-gap-shaped air space is defined. The leading-in cable 5 is provided with an insulation, to which no special demands are made, because the leading-in cable 5 is led to the outside only through air and not through the hot pressurized water 7. The anode pressure plate 12 seals off the cell block 1 at this end toward the outside with respect to the pressurized water 7.

The cathode 4 situated on the other end of the cell block 1 is on the same potential as the pressure vessel 2 which simultaneously is the earth potential (mass). The housing parts forming the outer enclosure of the cell block 1 are also on this potential. The leading-in cable 6 connected with the cathode 4 is led through the pressurized water 7 to the outside via seal 9 and therefore forms a "wet" current feed. Since the leading-in cable 6, the housing of the cell block 1 and the pressure vessel 2 are on the same potential, no electric isolation is required for the leading-in cable 6, or if one is nevertheless present, no special demands are made on this isolation. Since no potential-related differences exist between the cathode 4, the leading-in cable 6, the housing of the cell block 1 and the pressure vessel, a completely intrinsic contact protection of the vessel exists to the outside and there is no danger of electrocorrosion.

The pressure vessel 2 has a bell-shaped construction and is provided with a flange on the circumference of its open end. The opening of the pressure vessel 2 is closed off by means of a base plate 11 which is connected with the flange of the pressure vessel 2 by means of bolts. A seal 10 is provided between the flange of the pressure vessel 2 and the base plate 11.

Figure 2:
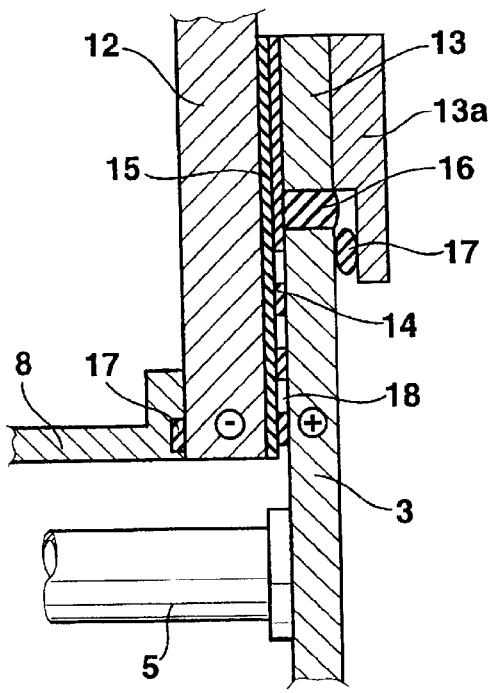
FIG. 2 is an enlarged cutout from FIG. 1, which is shown as "detail X" there, for explaining the implementation of an encapsulated electrode in the interior of the cell block according to the embodiment of FIG. 1.

As illustrated in detail in FIG. 2, the anode 3 is held by means of an anode frame 13a and a blind frame 13, which together form a holding frame 13, 13a, in an electrically isolated manner on the interior side of the anode pressure plate 12. The blind frame 13 consists of a plastic material. Between the blind frame 13 and the anode pressure plate 12, two sealing plates 14, 15 are arranged which consist of an electrically isolating, creep-resistant and pressure-resistant material, and which are pressed by means of the blind frame 13 and the anode frame 13a against the anode pressure plate 12 and form a flat insulation and sealing between the blind frame 13 and the anode pressure plate 12. The sealing plate 15 facing the anode pressure plate 12 has a solid surface in the area of the blind frame 13 as well as in the area of the anode 3, whereas the sealing plate 14 facing the anode 3 has a solid surface in the area of the blind frame but has openings or channels 18 in the area of the anode 3 which are connected with the ring gap, which is defined by the channel 8 and the anode pressure plate 12 and surrounds the leading-in cable 5, and through which openings or channels 18 water vapor generated between the anode 3 and the anode pressure plate 12 can exit by way of the channel 8. The space between the blind frame 13 and the anode 3 is filled by means of an insulating casting compound 16. A seal 17 is situated between the anode frame 13a and the anode 3. The sealing plates 14, 15 form the electric insulation between the anode 3 and the anode pressure plate 12 on the electric potential of the cathode. The surface around the leading-in cable 5 recessed from the anode pressure plate 12, because of the excess pressure in the interior of the cell block 1, results in a pressure force on the anode 3 which acts toward the outside and which contributes to applying the pressing force required for its sealing-off with respect to the anode pressure plate 12.

According to another construction of the first embodiment of the electrolyzer of the invention, the cathode 4 may be arranged in the interior of the cell block 1 in an encapsulated, electrically isolated manner with respect to the pressurized water 7, in which case the leading-in cable connected with the cathode 4 is also led in a dry and pressureless manner to the outside through a channel which leads from the cell block 1 through the pressure vessel 2 and is sealed off with respect to the pressurized water 7. In this case, the cathode and the leading-in cable connected with it is therefore completely and reliably electrically isolated with respect to the pressure vessel 2.

Figure 3:
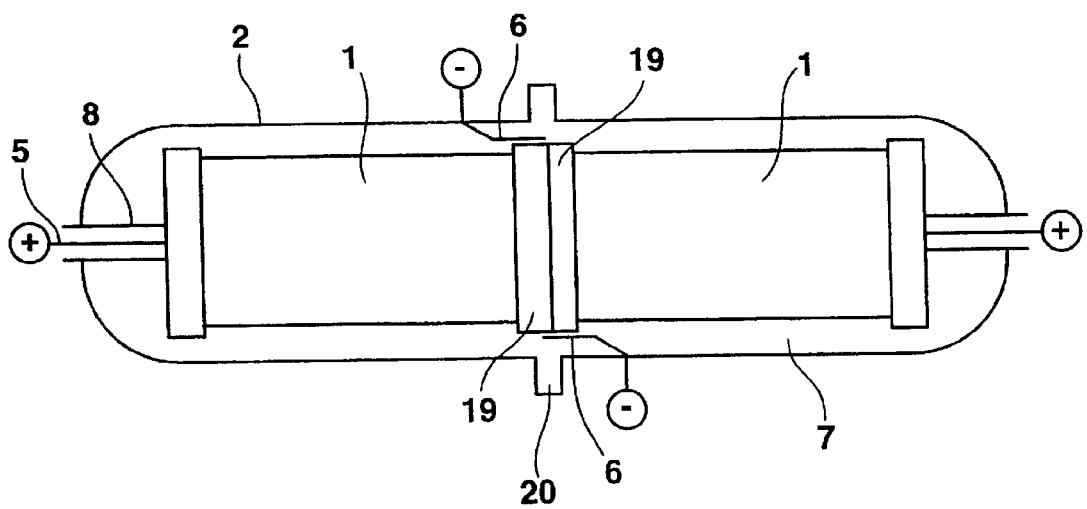
FIG. 3 is a cross-sectional view of an arrangement of two electrolytic cell blocks which are arranged in a common pressure vessel and are coupled on the face side, according to a second embodiment of the invention.

According to a second embodiment, which is illustrated in FIG. 3, two electrolytic cell blocks 1 are coupled to one another on the face side by way of common cathode flange plates 19 and are housed in a common pressure vessel 2. The current supply to the anodes of the two cell blocks 1 takes place in a manner similar to that of the first embodiment explained by means of FIG. 1 by way of leading-in cables 5 which are led in channels 8 sealed off with respect to the pressurized water 7 in the interior of the pressure vessel 2, at the anodes situated on the ends of the cell blocks 1. The leading-in cables 6 of the cathodes situated on the abutting ends of the two cell blocks 1, like the cathodes themselves, are on the same potential as the pressure vessel 2 and the ground potential (mass). Therefore, no significant demands are made on them with respect to the insulation, and they are led as "wet" current feeds through the pressurized water to the outside.

The pressure vessel 2 of this second embodiment is formed by two bell-shaped vessel parts which are similar to that of the first embodiment. Since the two bell-shaped vessel parts abut one another on their open sides, the base plate 11 required in the first embodiment which closes off the pressure vessel is eliminated, which saves considerable expenses.

The coupled cell block illustrated in FIG. 3 may, for example, have twice 150 cells with a surface of 1 m² each, and a connecting power of 4.8 MW. The foregoing disclosure has been set forth merely to illustrate the invention and is not intended to be limiting. Since modifications of the disclosed embodiment incorporating the spirit and substance of the invention may occur to persons skilled in the art, the invention should be comstrued to include everything within the scope of the appened claims and equivalents thereof.

What is claimed is:

1. An electrolyzer, comprising:
    a pressure vessel defining an interior containing water under pressure;
    a cell block including a plurality of electrolytic cells disposed in the interior of said pressure vessel, said cell block including a first electrode on a first end and a second electrode on a second end opposite said first end, said first electrode being arranged in an encapsulated, electrically isolated manner with respect to the water;
    a first cable coupled to said first electrode and leading outside of said pressure vessel;
    a second cable coupled to said second electrode and leading outside of said pressure vessel; and
    a channel defining a space communicating with said first electrode with an ambient atmosphere, said space being sealed off from said water, said first cable extending through said space.

2. An electrolyzer according to claim 1, wherein the second electrode and the second cable have the same potential as the pressure vessel, and wherein the second cable extends through the water.

3. An electrolyzer according to claim 2, wherein the potential of the second electrode is the earth potential.

4. An electrolyzer according to claim 1, wherein the second electrode is arranged in an encapsulated, electrically isolated manner with respect to the water, and wherein the second cable connected with the second electrode extends to the second electrode through a channel which leads from the cell block through the pressure vessel and is sealed off with respect to the water.

5. An electrolyzer according to claim 1, further comprising an electrode pressure plate arranged outside of said first electrode at said first end, said electrode pressure plate defining a recess communicating with the space defined by said channel; and
    a holding frame which supports said first electrode in an electrically isolated manner.

6. An electrolyzer according to claim 5, further comprising at least one sealing plate made of an electrically insulating material arranged between the first electrode and the electrode pressure plate.

7. An electrolyzer according to claim 6, wherein said at least one sealing plate defines at least one opening which communicates with the recess in the electrode pressure plate via which water vapor generated between the first electrode and the electrode pressure plate can exit into the channel.

8. An electrolyzer according to claim 5, wherein the electrode pressure plate consists of an austenitic precious steel.

9. An electrolyzer according to claim 5, wherein the holding frame includes a blind frame consisting of plastic.

10. An electrolyzer according to claim 1, wherein the cell block contains an alkaline electrolyte.

11. An electrolyzer according to claim 1, wherein the first electrode is an anode and consists of nickel.

12. An electrolyzer according to claim 1, wherein said cell block is a first cell block, and further comprising:
    a second cell block arranged in said pressure vessel, said second cell block having a first electrode and a second electrode, said second electrode abutting the second electrode of said first cell block;
    a third cable coupled to said first electrode of said second cell block and leading outside of said pressure vessel; and
    a channel defining a second space communicating with said first electrode of said second cell block with the ambient atmosphere, said a second space being sealed off from said water, said third cable extending through said second space.

13. An electrolyzer according to claim 12, further comprising a fourth cable coupled to said second electrode of said second cell block and leading outside of said pressure vessel, wherein the second and fourth cables have the same potential as the pressure vessel and extend through the pressurized water to the ambient atmosphere.

14. An electrolyzer according to claim 13, wherein the potential of the second and fourth electrodes is the earth potential.

15. An electrolyzer according to claim 12, wherein the pressure vessel consists of two abutting vessel parts.

16. An arrangement for mounting an electrode in an electrolyzer in an encapsulated, electrically isolated manner, said electrolyzer including a pressure vessel defining an interior containing water, and a cell block including a plurality of electrolytic cells disposed in the interior of said pressure vessel, said arrangement comprising:

- a channel extending into the interior of the pressure vessel, said channel defining a space which is sealed off from the interior of the pressure vessel and which communicates with an ambient atmosphere;
- an electrode pressure plate sealingly coupled to said channel, said electrode pressure plate defining a recess communicating with said space;
- an electrode disposed adjacent said electrode pressure plate on a side opposite said channel; and
- a cable coupled to said electrode, said cable extending through said recess defined in said electrode pressure plate and said space defined by said channel to said ambient atmosphere.

17. An arrangement according to claim 16, further comprising a holding frame which supports said electrode in an electrically isolated manner.

18. An arrangement according to claim 16, further comprising at least one sealing plate made of an electrically insulating material arranged between the electrode and the electrode pressure plate.

19. An arrangement according to claim 18, wherein said at least one sealing plate defines at least one opening which communicates with the recess in the electrode pressure plate.

20. A method of mounting an electrode in an electrolyzer in an encapsulated, electrically isolated manner, said electrolyzer including a pressure vessel defining an interior containing water, and a cell block including a plurality of electrolytic cells disposed in the interior of said pressure vessel, said method comprising:

- providing a channel extending into the interior of the pressure vessel, said channel defining a space which is sealed off from the interior of the pressure vessel and which communicates with an ambient atmosphere;
- sealingly coupling an electrode pressure plate to said channel, said electrode pressure plate defining a recess communicating with said space;
- providing an electrode adjacent said electrode pressure plate on a side opposite said channel; and
- providing a cable extending from said ambient atmosphere through said space defined by said channel and through said recess defined in said electrode pressure plate and coupling a cable to said electrode.

* * * * *